United States Patent [19]

Takase

[11] Patent Number: 4,822,138
[45] Date of Patent: Apr. 18, 1989

[54] LENS TUBE UNIT AND METHOD FOR PRODUCING THE SAME

[75] Inventor: Hironori Takase, Kawasaki, Japan

[73] Assignee: Canon Kabushiki Kaisha, Japan

[21] Appl. No.: 935,383

[22] Filed: Nov. 26, 1986

[30] Foreign Application Priority Data

Nov. 27, 1986 [JP] Japan ................. 60-266781
Nov. 27, 1986 [JP] Japan ................. 60-266782

[51] Int. Cl.$^4$ ................................. G02B 7/02
[52] U.S. Cl. ........................... 350/252; 350/255; 350/320; 264/242
[58] Field of Search ........... 350/252, 255, 429, 320; 264/255, 242, DIG. 53, DIG. 57, 328; 425/564–566, 570, 571, 132

[56] References Cited

U.S. PATENT DOCUMENTS

| | | | |
|---|---|---|---|
| 2,932,237 | 4/1960 | Back | 350/255 |
| 2,956,492 | 10/1960 | Quick | 350/252 |
| 3,168,610 | 2/1965 | Kende | 350/429 |
| 3,599,290 | 8/1971 | Garner | |
| 3,733,156 | 5/1973 | Garner | |
| 3,773,405 | 11/1973 | Sugano | 350/252 |
| 3,809,519 | 5/1974 | Garner | |
| 4,172,634 | 10/1979 | Thompson | 350/429 |
| 4,175,831 | 11/1979 | Ito | 350/429 |
| 4,472,031 | 9/1984 | Muryoi | 350/429 |
| 4,690,514 | 9/1987 | Kamata et al. | 350/429 |

Primary Examiner—John K. Corbin
Assistant Examiner—Loha Ben
Attorney, Agent, or Firm—Fitzpatrick, Cella Harper & Scinto

[57] ABSTRACT

A lens tube unit composed of an intermediate tube composed of metal or resin and provided with a helicoid or helicoids on the internal periphery and/or external periphery; and an inner tube and an outer tube fitted with or screwed in the internal and external peripheries of the intermediate tube and provided with a fitting portion or helicoid; and the outer and/or inner tube is molded as a sandwich structure consisting of a central core resin layer and skin resin layers.

3 Claims, 3 Drawing Sheets

LENS TUBE UNIT AND METHOD FOR PRODUCING THE SAME

BACKGROUND OF THE INVENTION

1. Field of the Invention

The present invention relates to a lens tube unit to be employed in photographing equipment or optical equipment such as a camera, and a method for producing the same.

2. Related Background Art

A lens tube is composed plural tube members fitted together, and focusing or zooming operation is performed by helicoid screws, cams and cam followers, key members and key grooves, or spring members provided between such tube members for transmitting a rotary or translating force. Particularly a helicoid mechanism has an advantage of easily attaining a high precision in the lens movement, since a movement parallel to the optical axis is caused by mutual rotation of a female lens tube and a male lens tube.

On the other hand, in lens tubes, particularly in those for cameras, there are commonly employed so-called molded lens tubes, formed by plastic molding, for improving the precision of lens tube components and for reducing the production cost.

It is already commonly known to separately form the male and female tube members of a lens tube by plastic molding and to combine the thus formed tube members. Also the Japanese Patent Publication 4768/1985, corresponding to the U.S. Pat. No. 4,115,505 discloses a method of utilizing a female lens tube as a forming mold, and forming a male lens tube by injecting a resinous material into a molding cavity formed by said forming mold and the surfaces of plural mold members.

In case of separate plastic molding of the tube members constituting the lens tube, there is required an expensive molding apparatus in order to achieve a high finishing precision of the molds since otherwise the fitting of the female and male lens tubes has to be adjusted later, thus leading to an elevated cost of the lens tube.

On the other hand, the above-mentioned method disclosed in the Japanese Patent Publication 4768/1985 corresponding to the U.S. Pat. No. 4,115,505 can be effectively applied to a lens tube composed of a pair of male and female tube members, but is not suitable for a lens tube composed of a larger number of tube members. Also in the manufacture of a lens tube for use in a camera or the like, it is necessary to consider the precision of helicoids of the mutually fitted tube members, slidability of the fitted or screwed surfaces, and the realization of a desired strength in the tube members.

For example the Japanese Utility Model Application Laid-open 1009/1984, corresponding to the U.S. Pat. No. 4,309,076, discloses a lens tube unit composed of an intermediate tube provided with helicoids on the internal external peripheries and outer and inner tubes engaging with the helicoids of said intermediate tube. Such lens tube unit of three-layer structure composed of the outer, intermediate and inner tubes requires plural molding steps if it is manufactured by the method disclosed in the aforementioned Japanese Patent Publication 4768/1985.

On the other hand, the double helicoid structure as disclosed in the aforementioned Japanese Utility Model Application Laid-open 1009/1984 is associated with the problems of slidability of the screwed surfaces and the mechanical strength, in relation to the material constituting the lens tube members.

More specifically, polycarbonate resins are commonly employed for injection molding of lens tube members, and glass fibers are often mixed with such resins in order to improve the mechanical strength. Such glass fiber-reinforced polycarbonate resins are suitable for obtaining a sufficient strength in the lens tube, but if glass fibers are exposed on the fitted or screwed surface of the lens tube, it spoils the opposed surface. Also it is associated with the drawbacks of powder scattering and errors in optical precision after prolonged use.

Also in case of the aforementioned lens tube unit consisting of the outer, intermediate and inner tubes, these tube members perform rotary sliding motions relative to one another. Particularly in a lens tube for a camera, the smoothness of the rotating or sliding motion of the tube member has a significant influence on the feeling of the user in manual focusing operation.

The above-mentioned limitations in the slidability and in the mechanical strength cannot be resolved or reduced in the conventional method of manufacturing lens tubes.

SUMMARY OF THE INVENTION

In consideration of the foregoing, an object of the present invention is to provide a method for producing a lens tube unit composed of outer, intermediate and inner tubes and provided with a helicoid coupling and/or a fitted coupling between the outer and intermediate tubes and between the intermediate and inner tubes, and in particular a method for producing a novel lens tube unit capable of providing smooth fitting or screw engagement between the outer and intermediate tubes and between the intermediate and inner tubes.

Another object of the present invention is to resolve the aforementioned limitations of the prior technology, by employing a sandwich molded structure, consisting of a core layer and skin layers, in the outer and inner tubes fitted or screwed with the intermediate tube, and employing a resinous material of satisfactory slidability for said skin layers and a resinous material of satisfactory strength for said core layer.

BRIEF DESCRIPTION OF THE DRAWINGS

FIGS. 1 to 3 illustrate an embodiment of the present invention, wherein:

FIG. 1 is a partial cross-sectional view of a lens tube embodying the present invention;

FIG. 2 is a partial cross-sectional view of mold for producing the lens tube unit of the present invention; and FIG. 3 is a cross-sectional view of a lens tube unit molded by the mold shown in FIG. 2.

DETAILED DESCRIPTION OF THE PREFERRED EMBODIMENTS

Figure 1:
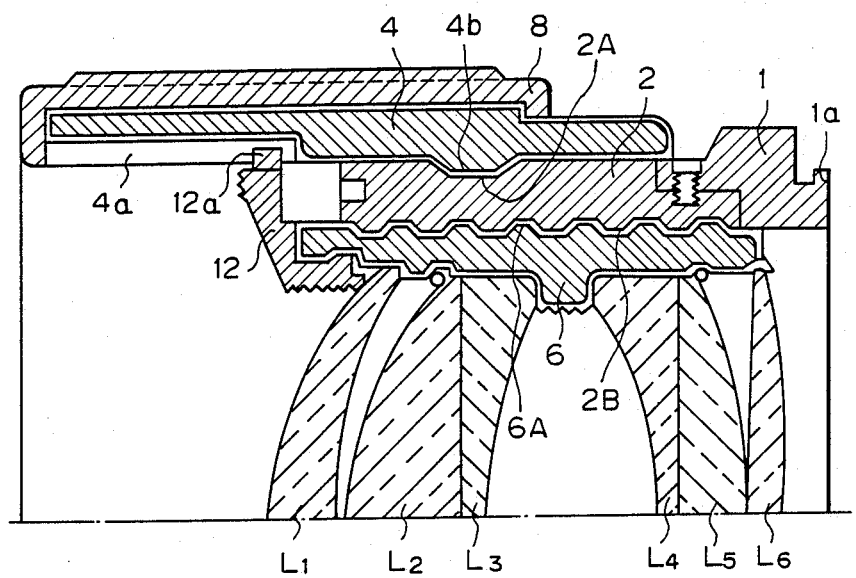

FIG. 1 is a partial cross-sectional view of a lens tube incorporating a lens tube unit of the present invention, wherein a fixed tube 1 is provided with a mount 1a for coupling with a mount member of an unrepresented camera. An intermediate tube 2 is provided, on the external and internal peripheries thereof, respectively with a fitting portion 2A and a helicoid portion 2B for engaging with an outer tube 4 and an inner tube 6. A focusing ring 8 is fixed to said outer tube 4 by means of unrepresented screws. The inner tube 6 is provided, on the external periphery thereof, with a helicoid portion 6A for engaging with the helicoid portion 2B of said intermediate tube 2, and, on the internal periphery thereof, with support portions for supporting lenses L1-Ln. A front cover member 12, fixed to said inner tube 6, is provided, on the external periphery thereof, with a key member 12a which engages with an axial groove 4a provided on the internal periphery of said outer tube 4.

In the above-explained structure, when the focusing ring 8 is rotated, the outer tube 4 rotates at a fixed position with respect to the intermediate tube 2, since a projection 4b provided on the internal periphery of the outer tube 4 engages with the annular groove 2A provided on the external periphery of the intermediate tube 2. The inner tube 6 is coupled with the intermediate tube 2 through said helicoid portions 6A and 2B, and is further coupled with outer tube 4 through the key groove and the key member of the front cover 12, so that a rotation of the focusing ring 8 causes an axial movement of the inner tube 6 with rotation, thus moving the lenses L1-Ln for focusing.

In the lens tube shown in FIG. 1, the outer tube 4, intermediate tube 2 and inner tube 6 constitute a lens tube unit, in which the intermediate tube 2 is composed of a metal or a first resinous material. The outer tube 4 and the inner tube 6 fitted with or screwed on the intermediate tube 2 have a molded sandwich structure composed of a central core material surrounded by superficial skin materials.

Figure 2:
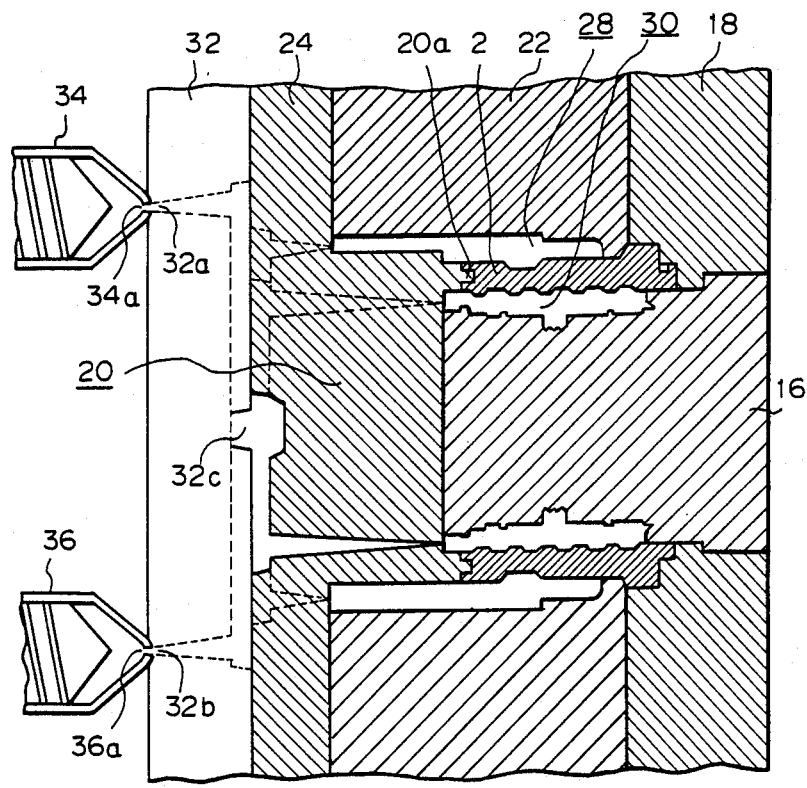
Figure 3:
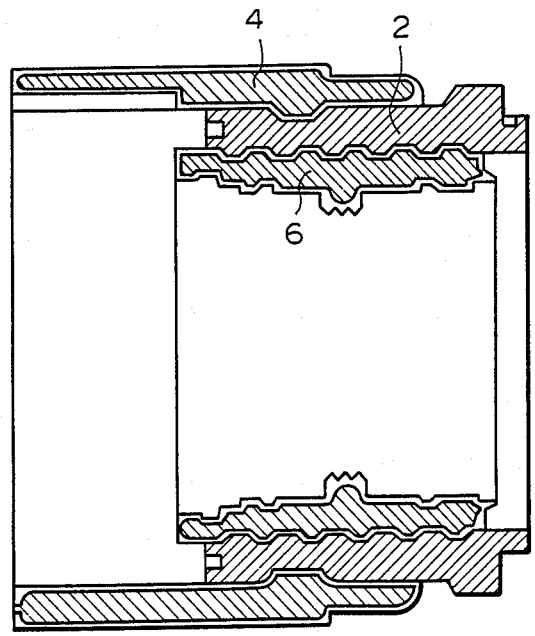

Now reference is made to FIGS. 2 and 3 for explaining a method for producing the above-explained lens tube composed of the outer tube 4, intermediate tube 2 and inner tube 6. FIG. 2 is a partial cross-sectional view of a mold, holding the intermediate tube 2 therein. Said intermediate tube 2 is composed of a metal such as aluminum, or a heat-resistant first resin material, and is fixed in said mold.

The mold shown in FIG. 2 is provided with a movable core member 16, a movable mold member 18, a fixed core member 20, a mold member 22 for supporting said intermediate tube 2, and fixed mold member 24.

The intermediate tube 2 is supported in the mold, by means of a support pin 20a extending from the movable core member 20, and by mold members 16, 18, 22. In the illustrated embodiment, the fixed tube 1 and the intermediate tube 2 are united to form an integral intermediate tube.

In said mold there are formed an annular molding cavity 28 by means of the intermediate tube 2 and the mold members 18, 20, 22, and another annular molding cavity 30 by means of the mold members 16, 20 and the intermediate tube 2, respectively inside and outside said intermediate tube 2.

A fixed mold member 32 is provided with sprues 32a, 32b connected with nozzles 34a, 36a of first and second injecting cylinders 34, 36 and is further provided with an inlet 32c where two injected resins are united.

In the apparatus shown in FIG. 2, the first injecting cylinder 34 is filled with a second resin material in melted state, which is composed of a polycarbonate resin for forming the skin layer. The second injecting cylinder 36 is filled with a third resin material for forming the central core layer, composed of a polycarbonate resin containing, for example glass fibers in 10 to 30 wt. %.

In molding the lens tube unit, the intermediate tube 2 is fixed in the mold as shown in FIG. 2, and a predetermined amount of the resin for the skin layer is injected from the first injecting cylinder 34. The injected second resin passes through runners and gates and is introduced into the molding cavities inside and outside the intermediate tube. Subsequently the second injecting cylinder injects the third resin for the core layer, which is introduced into the mold through same paths from the inlet 32c.

The third resin injected into the mold spreads the central portion of the second resin injected before, and said second resin proceeds in the cavities by the injection pressure of the third resin and is pressed against the walls of said cavities. In this manner, after injection of the third resin, the outer space of said molding cavities is filled with the second resin, while the inner space is filled with the third resin.

After the injection of a predetermined amount of third resin, the molded product consisting of the second and third resins is removed, together with the intermediate tube 2 from the mold as shown in FIG. 3.

The molded product taken out from the mold constitutes a lens tube unit consisting integrally of the outer tube 4, intermediate tube 2 and inner tube 6, wherein said intermediate tube 2 can rotate relative to the outer tube 4 due to the engagement of the annular groove 2A of the intermediate tube 2 with the projection 4b of the outer tube 4, while the intermediate tube 2 can move relative to the inner tube 6 due to the engagement therebetween through the helicoid portions 2B, 6a.

The outer and inner tubes of the above-explained lens tube unit are superficially composed of natural polycarbonate resin constituting the skin layers, and are internally composed of polycarbonate resin containing glass fibers. Consequently the intermediate tube 2, if composed of a metal of sufficient slidability such as aluminum, or a resin material of low characteristic and sufficient slidability, provides satisfactory sliding or rotating ability at the contacting surfaces with the outer and inner tubes 4, 6, and a satisfactory strength is assured in said outer and inner tubes 4, 6 due to the glass fiber-reinforced central core layer.

The lens tube is completed by combining the lens tube unit shown in FIG. 3 with other components.

The lens tube unit of the present invention allows integral simultaneous molding of the outer and inner tubes 4, 6, utilizing the intermediate tube 2 as a molding member, and also provides satisfactory strength and slidability through the use, in the outer and inner tubes 4, 6 movable relative to the intermediate tube 2, of a sandwich structure the surface of which is composed of a resin showing satisfactory slidability in combination with the intermediate tube 2 and the strength of which is assured by a core layer of glass fiber-reinforced resin.

In particular the use of a metal such as aluminum for the intermediate tube 2 in consideration of its use as a molding member improves the dimensional characteristics in the molding of the outer and inner tubes, thus obtaining a lens tube with a high precision of lens movements.

What I claim is:

1. A lens tube unit comprising:
  an intermediate tube having inner and outer elongate surfaces and provided with at least one helicoid on at least one of said surfaces:
  an outer tube member and an inner tube member, said outer and inner tube members each including a central portion including a core layer and an outer peripheral layer;

said core layer being formed from a glass fiber reinforced material;

said outer peripheral layer being formed from a superficial skin layer material of polycarbonate; and saidf intermediate tube being positioned such that at least a portion of said inner and outer elongate surfaces engage with at least a portion of said outer peripheral layers of said inner and outer tube members respectively.

2. A lens tube unit according to claim 1, wherein at least one of said inner and outer tube members is provided with a helicoid.

3. A method for producing a lens tube unit comprising the steps of:

supporting, in a mold, an elongate molding member having an internal and an external surface and composed of material selected from the group consisting of a metal and a first resin material and provided with a fitting portion on one of said surfaces;

forming molding cavities for forming an outer tube and an inner tube respectively provided with an engaging portion to engage with said molding member;

connecting, to said mold, a first injecting cylinder for injecting a second resin material for forming a skin layer and a second injecting cylinder for injecting a third resin material for forming a core layer;

injecting a predetermined amount of said second resin material into said molding cavities from said first injecting cylinder and then injecting said third resin material from said second injecting cylinder, thereby pressing the second resin material injected at first against the walls of said molding cavities by said third resin material and filling respective central spaces of said molding cavities with said third resin material, thus filling respective outer spaces of said molding cavities with said skin layer resin and said respective central spaces of said molding cavities with said core layer resin;

taking said molding member and molded products integrally formed on the external and internal surfaces thereof from the mold after said molding cavities are filled with resin materials; and utilizing said molding member as an intermediate tube, said molded product on the external surface of said molding member as an outer tube, and said molded product on the internal surface of said molding member as an inner tube.

* * * * *

UNITED STATES PATENT AND TRADEMARK OFFICE
CERTIFICATE OF CORRECTION

PATENT NO. : 4,822,138
DATED : April 18, 1989
INVENTOR(S) : HIRONORI TAKASE

It is certified that error appears in the above-identified patent and that said Letters Patent is hereby corrected as shown below:

COLUMN 1

Line 12, "composed" should read --composed of--.

COLUMN 4

Line 66, "surfaces:" should read --surfaces;--.

COLUMN 5

Line 7, "saidf" should read --said--.

Signed and Sealed this

Twenty-sixth Day of September, 1989

Attest:

DONALD J. QUIGG

*Attesting Officer*      *Commissioner of Patents and Trademarks*